US008023295B1

United States Patent
Shekhawat et al.

(10) Patent No.: US 8,023,295 B1
(45) Date of Patent: Sep. 20, 2011

(54) DIRECT CURRENT (DC) TO ALTERNATING CURRENT (AC) GENERATION

(75) Inventors: Sampat Shekhawat, Mountaintop, PA (US); Myungbok Kim, Bucheon (KR); Dong-Hye Cho, Bucheon (KR)

(73) Assignee: Fairchild Semiconductor Corporation, South Portland, ME (US)

( * ) Notice: Subject to any disclaimer, the term of this patent is extended or adjusted under 35 U.S.C. 154(b) by 241 days.

(21) Appl. No.: 12/217,244

(22) Filed: Jul. 2, 2008

(51) Int. Cl.
*H02M 3/335* (2006.01)
*H02H 7/122* (2006.01)

(52) U.S. Cl. ............... 363/56.11; 363/56.12; 363/21.04; 363/21.12; 363/97

(58) Field of Classification Search .................... 363/15, 363/16, 21.04, 21.08, 21.12, 21.15, 97, 131
See application file for complete search history.

(56) References Cited

U.S. PATENT DOCUMENTS

| 4,272,806 A | * | 6/1981 | Metzger | 363/21.17 |
| 5,610,804 A | * | 3/1997 | Shimizu | 363/21.16 |
| 5,978,238 A | * | 11/1999 | Liu | 363/56.09 |
| 6,654,261 B2 | * | 11/2003 | Welches et al. | 363/41 |

* cited by examiner

*Primary Examiner* — Gary L Laxton
(74) *Attorney, Agent, or Firm* — Sidley Austin LLP (57) ABSTRACT

In one embodiment, a power converter system comprises an input terminal operable to connect to a DC power source and an output terminal at which an output voltage can be provided. An active clamped forward converter is operable to provide forward power flow from the DC power source to the output terminal. A flyback converter is operable to provide backward power flow from the output terminal to the DC power source. The active clamped forward converter and the flyback converter cooperate to generate a rectified sinusoidal waveform at the output terminal.

18 Claims, 10 Drawing Sheets

DIRECT CURRENT (DC) TO ALTERNATING CURRENT (AC) GENERATION

BACKGROUND

1. Field of Invention

The present invention relates to power conversion, and more particularly, to direct current (DC) to alternating current (AC) generation.

2. Description of Related Art

Power converters are essential for many modern electronic devices. Among other capabilities, power converters can adjust voltage level downward (buck converter) or adjust voltage level upward (boost converter). Power converters may also convert from direct current (DC) power to alternating current (AC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." The power converters may also include one or more capacitors or inductors for alternately storing and outputting energy.

Previously developed designs for DC-to AC power converters suffer from numerous problems such as inefficiency due to heavy switching losses, the need for a low pass filter made up of many components, and relatively high total harmonic distortion (THD).

SUMMARY

According to an embodiment of the present invention, a power converter system comprises an input terminal operable to connect to a DC power source and an output terminal at which an output voltage can be provided. An active clamped forward converter is operable to provide forward power flow from the DC power source to the output terminal. A flyback converter is operable to provide backward power flow from the output terminal to the DC power source. The active clamped forward converter and the flyback converter cooperate to generate a rectified sinusoidal waveform at the output terminal.

According to another embodiment of the present invention, a method is provided for a power converter system having an input terminal operable to connect to a DC power source and an output terminal at which an output voltage can be provided. The method includes the following: operating an active clamped forward converter to provide forward power flow from the DC power source to the output terminal; and operating a flyback converter to provide backward power flow from the output terminal to the DC power source; wherein the active clamped forward converter and the flyback converter cooperate to generate a rectified sinusoidal waveform at the output terminal.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1-9 of the drawings. Like numerals are used for like and corresponding parts of the various drawings.

Figure 1:
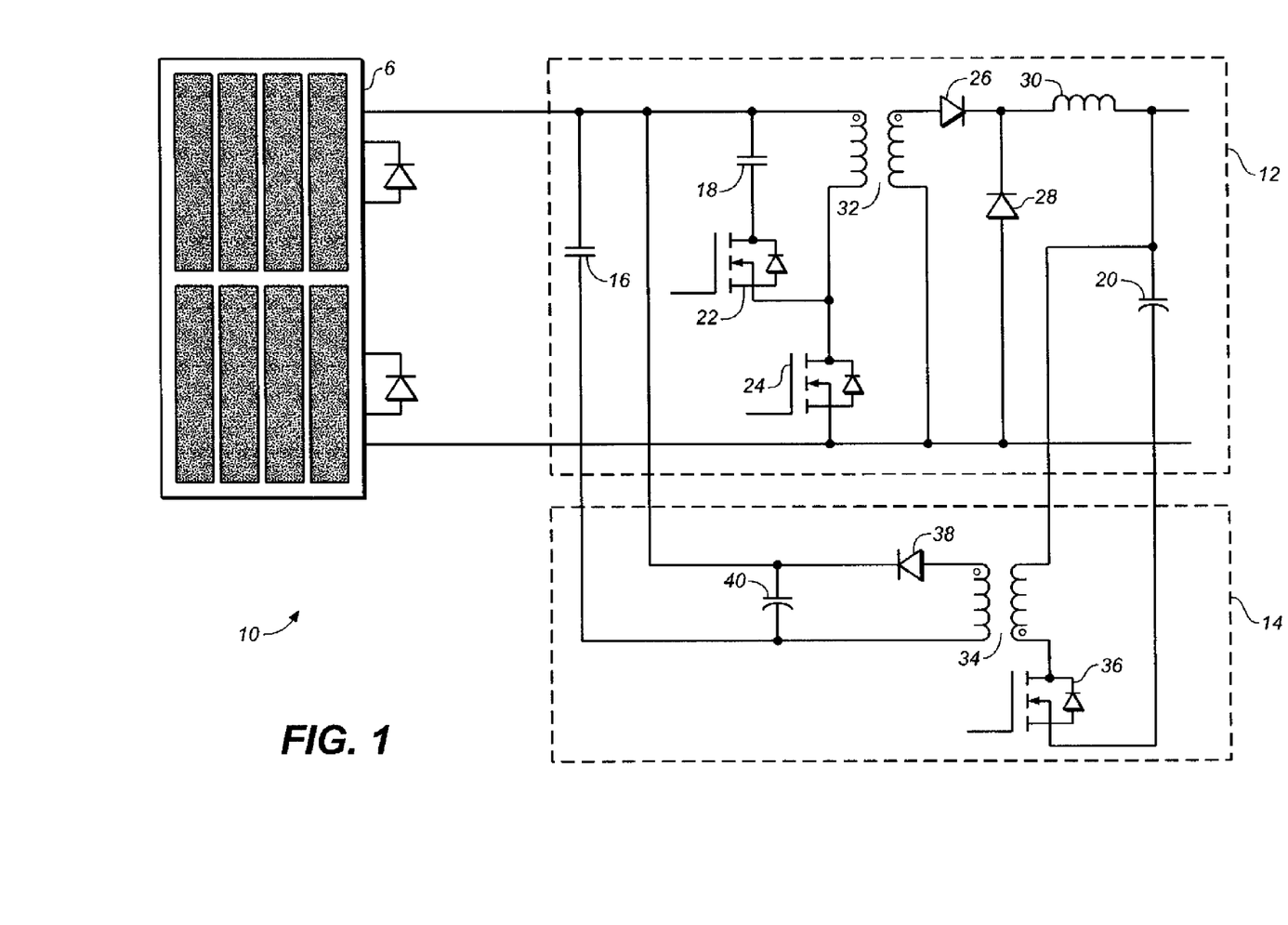
FIG. 1 is a schematic diagram of an implementation of a power converter system, according to an embodiment of the invention.

FIG. 1 is a schematic diagram of an implementation of a power converter system 10, according to an embodiment of the invention. The power converter system 10 can convert a direct current (DC) power to alternating current (AC) power, and thus, is a DC/AC converter. Power converter 10 receives the DC power from a DC power source 6 at an input terminal. The power converter system 10 provides a rectified AC power at an output terminal (VOUT). Portions of the rectified waveform may be inverted to produce a sinusoidal AC waveform. For example, a full sinusoidal voltage waveform can be generated from the output of power converter system 10 using a full bridge inverter in a subsequent stage.

In one embodiment, the DC power source 6 may comprise, for example, a plurality of solar modules which generate power (e.g., voltage) in response to light. The solar modules may be coupled to the input terminal of the power converter system 10. As used herein, the terms "coupled" or "connected," or any variant thereof, covers any coupling or connection, either direct or indirect, between two or more elements or components. Each solar module may comprise one or more strings of solar cells. At least some of the solar modules 14 in the system 10 may be connected in series.

Power converter system 10 includes an active clamped forward (ACF) converter 12 and a flyback converter 14.

The ACF converter 12 provides or supports the function of forward power flow—i.e., flow of power from the DC source to the output terminal. As shown, the ACF converter 12 includes capacitors 16, 18, 20, switches 22, 24, diodes 26, 28, inductor 30, and transformer 32. The switch 24 is a main switch which is turned on and off by an appropriate control signal applied to its control terminal. In ACF converter 12, the main switch 24 is turned on and off under zero voltage conditions ("soft" switching transitions). When main switch 24 is turned on, current flows through a primary winding of the transformer 32. This induces current to flow in the secondary winding of the transformer, and then through the diode 26 and inductor 30. Inductor 30 and output capacitor 20 implement an LC filter for the output of power converter system 10. Output capacitor 20 is charged by the current flowing through inductor 30. As output capacitor 20 is charged, the voltage at the output of the ACF converter 12 rises. When main switch 24 is turned off, current does not flow through either winding of transformer 32. Output capacitor 20 may then discharge, and accordingly, the voltage at the output of the ACF converter decreases.

Switch 22 is an active switch which may clamp the primary winding of the transformer 32 to the reset capacitor 18. Active clamp switch 22 is operable to be turned on for clamping the primary winding of the transformer 32 and to reduce the magnetizing current of transformer 32 (for example, to zero) so as to reset the magnetic core. Switch 22 also allows a controlled (switched) transfer of energy back from the reset capacitor 18 to the primary side power stage of the converter. Current in the "channel" of switch 22 is bidirectional during part of its active interval, but is zero during the remainder of the switching cycle. The active clamp and reset techniques are inactive during the normal power transfer portion of the switching cycle, and only operate when the main switch 24 is turned off.

The flyback converter 14 provides or supports the function of backward power flow—i.e., flow of power from the output to the DC source. The flyback converter 14 is coupled to the ACF converter 12 and includes a transformer 34, switch 36, diode 38, and capacitor 40. The transformer 34 is coupled to LC filter of the ACF converter 12. Under light load or no load conditions for the system 10, current flows from capacitor 20 of the ACF converter 12 through the primary winding of transformer 34. This induces a current to flow through the secondary winding of transformer 34, which charges the flyback capacitor 40 through diode 38. Energy may be fed back from the flyback capacitor 40 to the input source for power converter system 10.

Switches 22, 24 in ACF converter 12 and switch 36 in flyback converter 14 may each be implemented as a metal-oxide-semiconductor field effect transistor (MOSFET), but it is understood that these transistor can be implemented with other suitable devices such as, for example, insulated gate bipolar transistors (IGBTs), insulated gate field effect transistors (IGFETs), bipolar junction transistors (BJTs), etc. Each of switches 22, 24, and 36 receives respective control signals for causing the switches to turn on and off.

In operation, the ACF converter 12 and flyback converter 14 cooperate or work together to generate the rectified sinusoidal output voltage at output capacitor 20. The ACF converter 12 is active under heavy load condition for the power converter system 10, and provides or supports the function of forward power flow from the DC source to the output terminal. The flyback converter 14 becomes active when there is light load or no load for system 10 and feeds the energy back to the DC source. The ACF converter 12 functions to increase the output voltage, whereas flyback converter 14 reduce the output voltage. If the output voltage of the power converter system 10 is below a certain bottom value or bottom band, the ACF converter 12 operates for increasing the output voltage with forward power flow. Once the output voltage exceeds a certain upper value or upper band, the flyback converter 14 starts to operate for reducing the output voltage with backward power flow.

Power converter system 10 provides a number of advantages over previously developed techniques, including: reducing switching loss, thus improving efficiency; reducing or eliminating the components for a low pass filter, thereby reducing cost, power density and improving reliability; and reducing total harmonic distortion (THD). For example, in previously developed designs for DC-to-AC power converters, a first stage converter is used to boost the DC voltage, while a second stage inverter is used to convert the boosted DC voltage to AC voltage with pulse width modulation (PWM). Hence, the modulation frequency can be in the range, for example, from 10 kHz to 50 kHz. Therefore, the switching loss of the second stage inverter is considerable. In comparison, with embodiments of the present invention, a rectified sinusoidal voltage is made at the first stage using a more efficient active clamp forward (ACF) converter, and then the waveform is flipped at a lower frequency, for example, in the range of 50 or 60 Hz. As a result, embodiments of the present invention can reduce the switching loss at the inverter stage.

Figure 2:
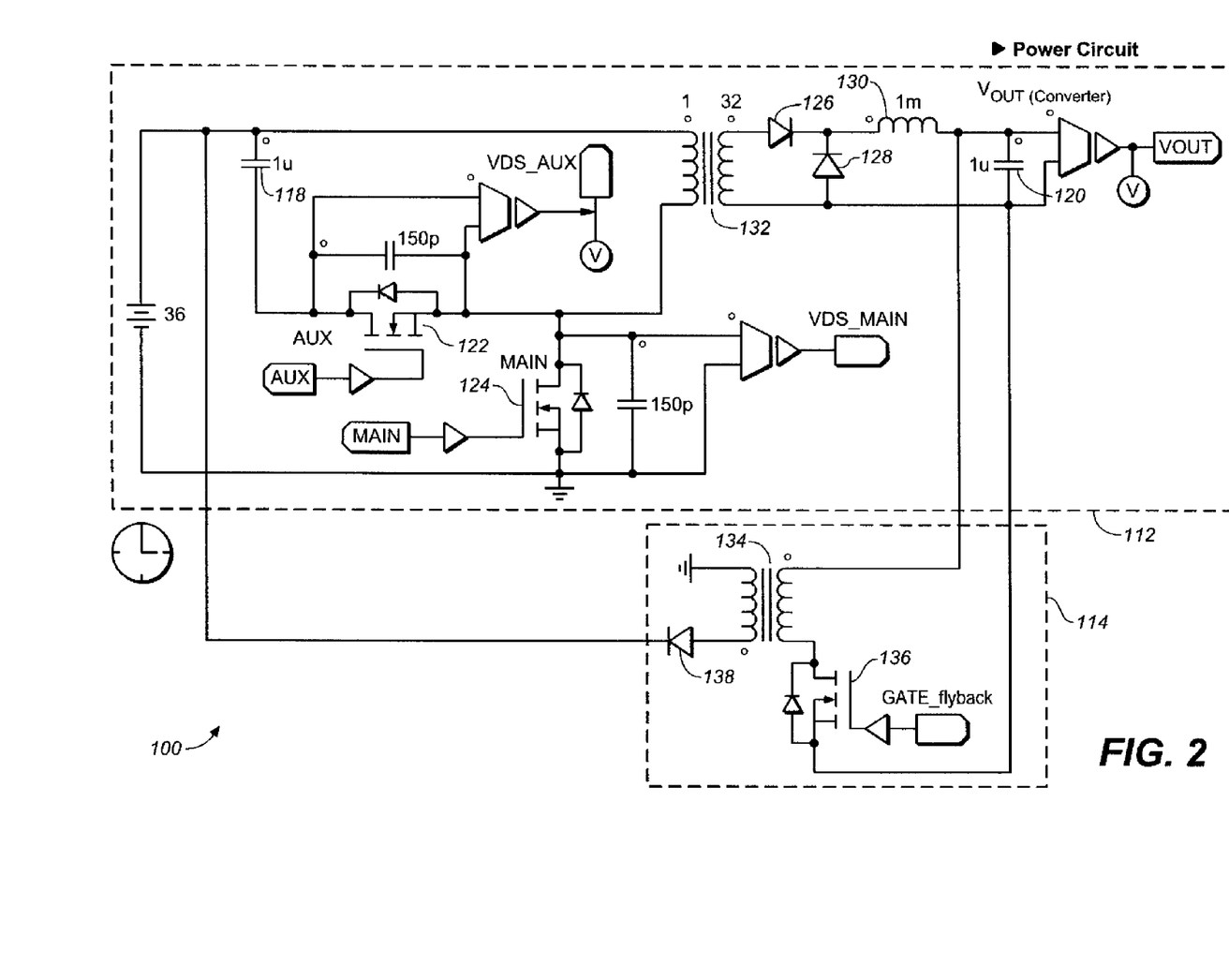
FIG. 2 is a schematic diagram of an implementation of a power converter system, according to an embodiment of the invention.

FIG. 2 is a schematic diagram of an implementation of a power converter system 100, according to an embodiment of the invention. Power converter system 100 may be coupled to receive a DC voltage source at its input, and functions to generate a rectified sinusoidal voltage waveform as its output voltage VOUT. With the rectified sinusoidal voltage, a full sinusoidal voltage waveform can be readily generated using a full bridge inverter in a subsequent stage of the system.

The power converter system 100 includes an active clamped forward (ACF) converter 112 and a flyback converter 114. The implementation and operation of ACF converter 112 and flyback converter 114 shown in FIG. 2 are substantially similar to the ACF converter 12 and flyback converter 14 of power converter system 10 shown in FIG. 1.

In this implementation, ACF converter 112 comprises capacitors 118, 120, active clamping switch 122, main switch 124, diodes 126, 128, inductor 130, and transformer 132. The main switch 124 receives a control signal MAIN at its control terminal, and the active clamping switch 122 receives a control signal AUX at its control terminal. The voltage drop across main switch 124 is VDS_MAIN, and the voltage drop across active clamping switch 122 is VDS_AUX. The flyback converter 114 includes transformer 134, switch 136, and diode 138. Switch 136 receives a control signal GATE_flyback at its control terminal.

The ACF converter 112 provides or supports the function of forward power flow from the DC source to the output VOUT. The flyback converter 114 provides or supports the function of backward power flow—i.e., the transfer of power from output to the DC source. Both converters 112 and 114 cooperate to generate the rectified sinusoidal output voltage.

In operation, under heavy load condition for power converter system 100, the ACF converter 112 is active and provides or supports the function of forward power flow from the DC source to the output terminal. Here, the turning on and off of the main switch 124 in ACF converter 112 causes the output capacitor 120 to be charged and discharged, so that the voltage at the output of ACF converter 112 rises and falls. Under light load or no load for system 100, the flyback converter 114 is active and feeds the energy back to the DC source. In particular, the switch 136 is turned on, allowing energy stored in capacitor 120 to be delivered back to the DC source through transformer 134.

Figure 3:
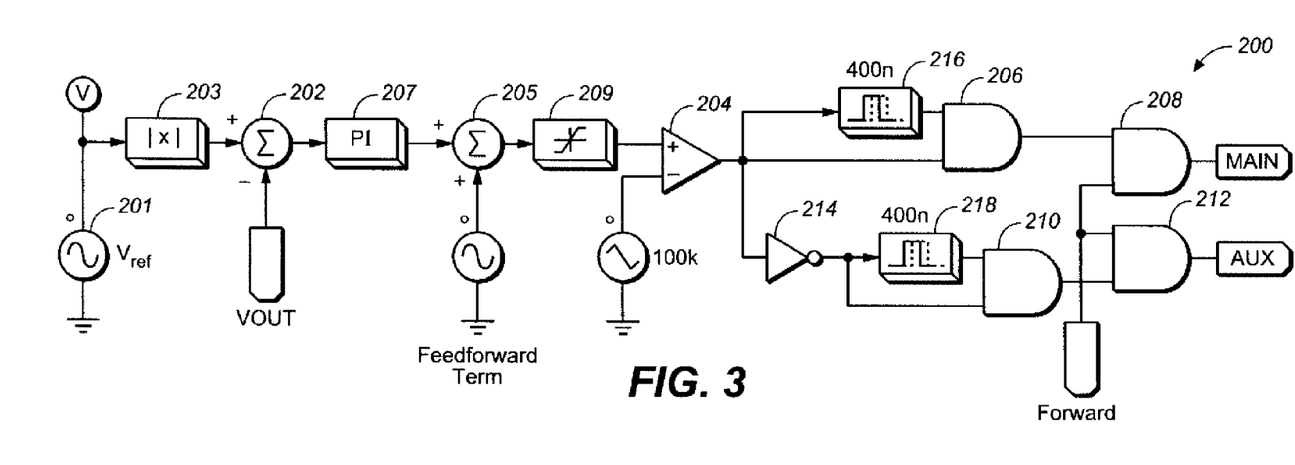
FIG. 3 is a schematic diagram of an implementation of a control circuit for an active clamped forward (ACF) converter of the power converter system, according to an embodiment of the invention.

FIG. 3 is a schematic diagram of an implementation of a control circuit 200 for an active clamped forward (ACF) converter, according to an embodiment of the invention. Control circuit 200, for example, generates control signals MAIN and AUX for controlling the main switch 124 and active clamp switch 122 in the ACF converter 112 shown in FIG. 2. In one embodiment, the control circuit 200 only operates during forward power flow for the power converter system.

As depicted, control circuit 200 includes a sinusoidal reference voltage source 201, a multiplier 203, adder circuits 202, 205, a proportional-integral (PI) controller 207, a limiter 209, a comparator 204, AND gates 206, 208, 210, 212, inverter gate 214, and delay elements 216, 218. Multiplier 203 multiplies the sinusoidal reference voltage by a certain value. Adder circuit 202 adds the modified sinusoidal reference voltage to the output voltage VOUT, which is provided as feedback. With the sinusoidal reference, control circuit 200 makes the output voltage VOUT follow the reference voltage. The PI controller 207 makes the error between the reference and output voltage to be zero by calculating the suitable duty ratio for the ACF converter (12 or 112). Adder circuit 205 adds the calculated duty ratio from PI controller 207 to a feedforward term signal, which can be provided by a synched oscillator. Alternately, if a microprocessor is used for control, the feedforward term can be obtained from a look-up table stored in the internal memory of the processor. Limiter 209 limits the calculated duty cycle from PI controller 307 so that it does not exceed a certain level. Because it is desirable to use the more efficient ACF converter (12 or 112) if possible rather than the less efficient flyback converter (14 or 114), the compensating feedforward term helps improve control performance.

The output of limiter 209 is provided to the non-inverting input terminal of comparator 204. The inverting input terminal of comparator 204 receives a ramp (triangular) waveform. The comparator 204 compares the input signals and generates an output, which is provided to both inputs of the AND gate 206 (one after delay by delay element 216). The inverse of the output of comparator 204 is provided to both inputs of the AND gate 210 (one after delay by delay element 214). A forward control signal is applied to an input of each of AND gates 208 and 212. The forward control signal is only active when the power converter system is providing forward power flow from the DC source to the output terminal. AND gate 208 outputs the control signal MAIN for controlling the main switch 124 in the ACF converter 112, and AND gate 212 outputs the control signal AUX for controlling the active clamping switch 122.

Figure 4:
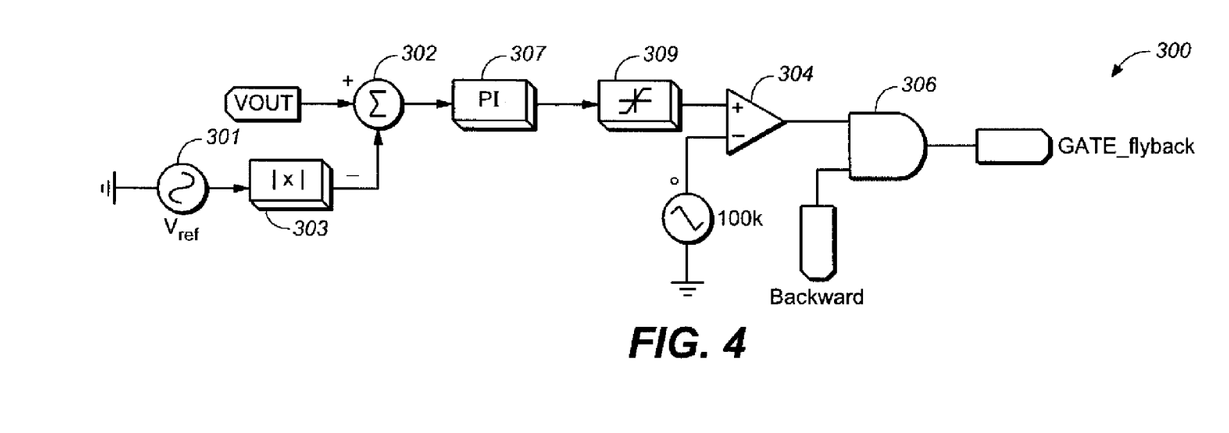
FIG. 4 is a schematic diagram of an implementation of a control circuit for flyback converter of the power converter system, according to an embodiment of the invention.

FIG. 4 is a schematic diagram of an implementation of a control circuit 300 for a flyback converter, according to an embodiment of the invention. Control circuit 300, for example, generates control signal GATE_flyback for controlling the switch 136 in the flyback converter 114 shown in FIG. 2. In one embodiment, control circuit 300 only operates during backward power flow.

As depicted, control circuit 300 includes a sinusoidal reference voltage source 301, a multiplier 303, an adder circuit 302, a proportional-integral (PI) controller 307, a limiter 309, a comparator 304, and AND gate 306. Multiplier 303 multiplies the sinusoidal reference voltage by a certain value. Adder circuit 302 adds the modified sinusoidal reference voltage to the output voltage VOUT, which is provided as feedback. With the sinusoidal reference, this control circuit 302 makes the output voltage follow the reference voltage. PI Controller 307 makes the error between the reference and output voltage to be zero by calculating the suitable duty ratio for the flyback converter (14 or 114). Limiter 309 limits the calculated duty cycle from PI Controller 307 so that it does not exceed a certain level.

The output of limiter 309 is provided to the non-inverting input terminal of comparator 304. The inverting input terminal of comparator 304 receives a ramp (triangular) waveform. The comparator 304 compares the input signals and generates an output, which is provided to one input of the AND gate 306. The other input of the AND gate 306 receives a backward control signal. The backward control signal is only active when the power converter system is feeding energy back to the DC source. AND gate 306 outputs the control signal GATE_flyback for controlling the switch 136 in the flyback converter 114.

Figure 5:
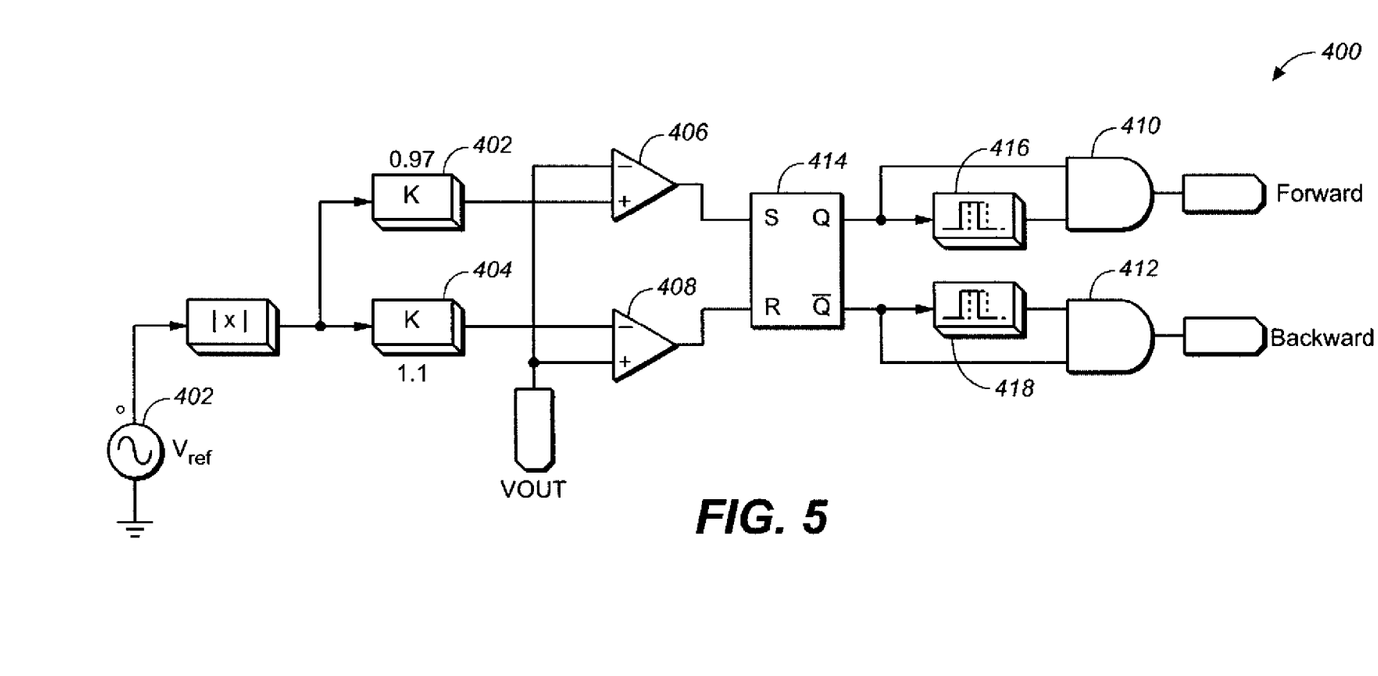
FIG. 5 is a schematic diagram of an implementation of a control circuit for forward and backward power flow, according to an embodiment of the invention.

FIG. 5 is a schematic diagram of an implementation of a control circuit 400 for forward and backward power flow, according to an embodiment of the invention. Control circuit 400 determines which power flow (forward, backward) is activated. Forward and backward power flow should not occur at a same time, and in some embodiments, dead time is provided between the transition from one power flow to the other.

Control circuit 400, for example, generates forward and backward control signals, for controlling the ACF converter 112 and the flyback converter 114, thereby determining which power flow (forward, backward) is activated. In both power flows, there is the hysteric band which prevents the oscillation between forward and backward power flow. Control circuit 400 also provides dead time or hysteresis (e.g., 5 us) between the transition from forward power flow to backward power flow, and vice versa.

In some embodiments, the amount of dead time or hysteresis for the transition from forward power flow to backward power flow is not the same as that for the transition from backward power flow to forward power flow. The reason to use such asymmetric hysteresis band is to increase the operating area (time) of the more efficient ACF converter 112 as compared to that of the less efficient flyback converter 114.

As depicted, control circuit 400 includes a reference voltage source 402, multiplier circuitry 402, 404, comparators 406, 408, AND gates 410, 412, latch 414, and delay elements 416, 418. Reference voltage source 402 provides a sinusoidal reference voltage. Multiplier circuitry 402 multiplies the sinusoidal reference voltage by a certain value (e.g., 0.97) to define an lower band for the power converter system 10. Multiplier circuitry 404 multiplies the sinusoidal reference voltage by another value (e.g., 1.1) to define a upper band for the power converter system 10.

The output of multiplier circuit 402 is provided to the non-inverting input terminal of comparator 406, while the output of multiplier circuit 404 is provided to the inverting input terminal of comparator 408. The output voltage VOUT of the ACF converter 112 is provided (as feedback) to both the inverting input terminal of comparator 406 and the non-inverting input terminal of comparator 408. Comparators 406 and 408 function to compare the output voltage VOUT against the respective input reference values for the upper and lower bands of the power converter system 10. Once the output voltage goes below the bottom band, the comparator 406 outputs a value for causing ACF converter (12 or 112) to operate, thereby increasing the output voltage with forward power flow. Once the output voltage VOUT exceeds the upper band, the comparator 408 outputs a value for causing the flyback converter (14 or 114) to operate, thereby reducing the output voltage with backward power flow.

In one embodiment, latch 414 is a set-reset (SR) flip-flip. The output of comparator 406 is provided to the set (S) input of the latch 414, while the output of comparator 408 is provided to the reset (R) input of the latch 414. The delay elements 416 and 418 delay the respective signals Q and Q bar output from latch 414. Control circuit 400 provides a hysteric band which prevents the oscillation between forward and backward power flows.

Figure 6:
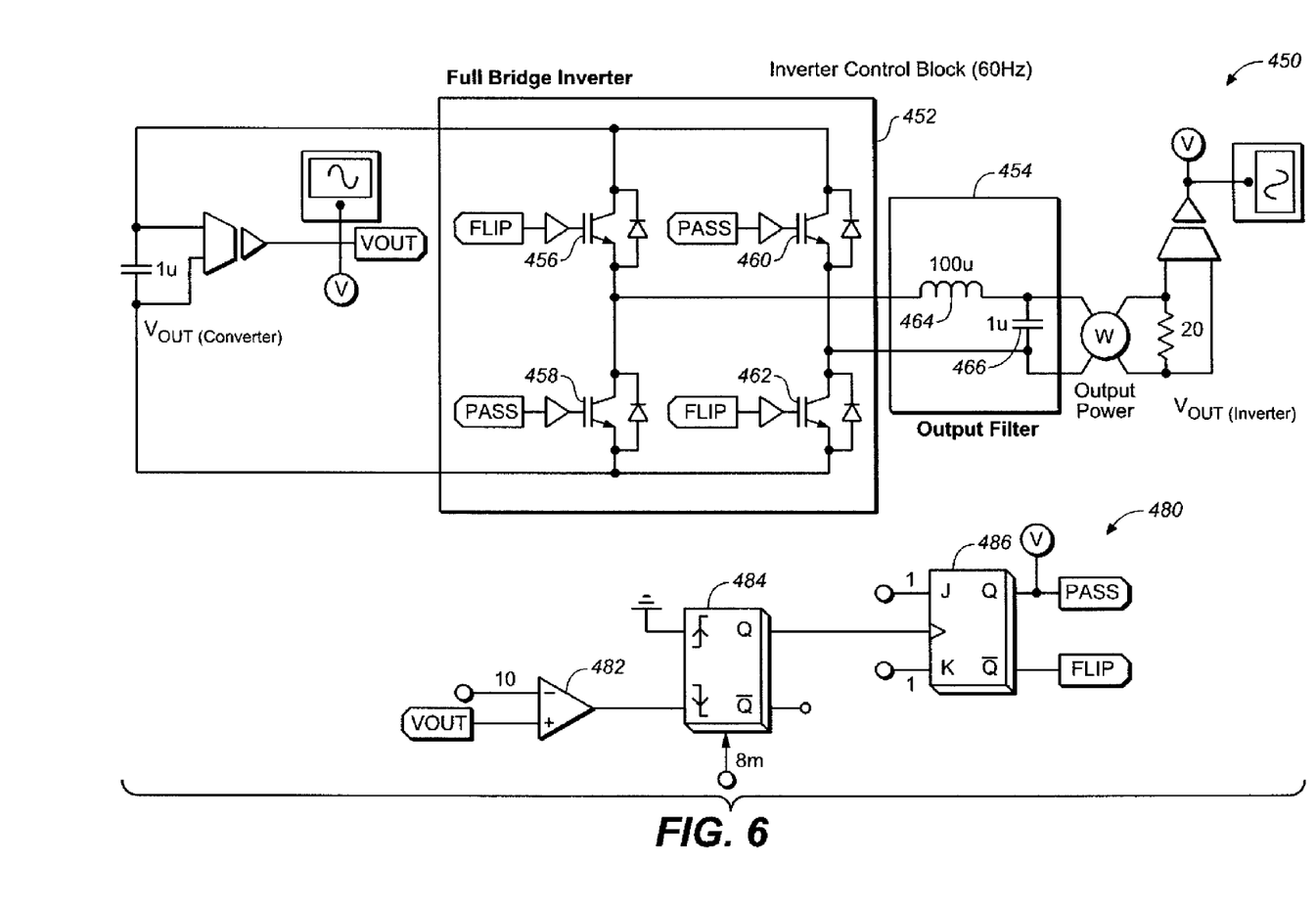
FIG. 6 is a schematic diagram of an implementation of an inverter circuit, according to an embodiment of the invention.

FIG. 6 is a schematic diagram of an implementation of an inverter circuit 450, according to an embodiment of the invention. The inverter circuit 450 can be part of the power converter system 10 and may be coupled to receive the output (VOUT) of the ACF converter (12 or 112), which is a rectified sinusoidal voltage. Inverter circuit 450 functions to invert the rectified sinusoidal voltage to generate a full sinusoidal voltage waveform. As depicted, inverter circuit 450 includes a full bridge inverter 452 and an output filter 454.

Full bridge inverter 452 includes four switches 456, 458, 460, 462. Switches 456 and 462 receive a control signal FLIP for turning on and off the switches. Switches 458 and 460 receive a control signal PASS for turning on and off the switches. Output filter 454 includes an inductor 464 and a capacitor 466.

A control circuit 480 may generate the control signals PASS and FLIP for turning on and off the switches 456, 458, 460, 462 of the inverter circuit 450. As depicted, control circuit 480 includes a comparator 482 and latches 484, 486.

Comparator 482 functions to compare the output voltage VOUT from the ACF converter against a reference voltage (e.g., 10V). In one embodiment, latch 484 is implemented as a D flip-flop with Q and Q-bar outputs. The output of comparator 482 is provided to one input of the latch 484. In one embodiment, latch 486 is implemented as a toggle flip-flop with J, K, and clock inputs and Q and Q-bar outputs. The Q output of latch 486 is output as the control signal PASS for switches 458, 460 in the full bridge inverter 452, and the Q-bar output of latch 486 is output as the control signal FLIP for switches 456, 462.

When the output voltage VOUT of the ACF converter (12 or 112) falls below the reference voltage (e.g., 10V), the Q output signal from latch 484 is held up for 8 msec. The Q output signal from latch 484 is delivered to the clock signal of latch 486 so that the practical gate signals PASS and FLIP for the full bridge inverter are generated.

Figure 7:
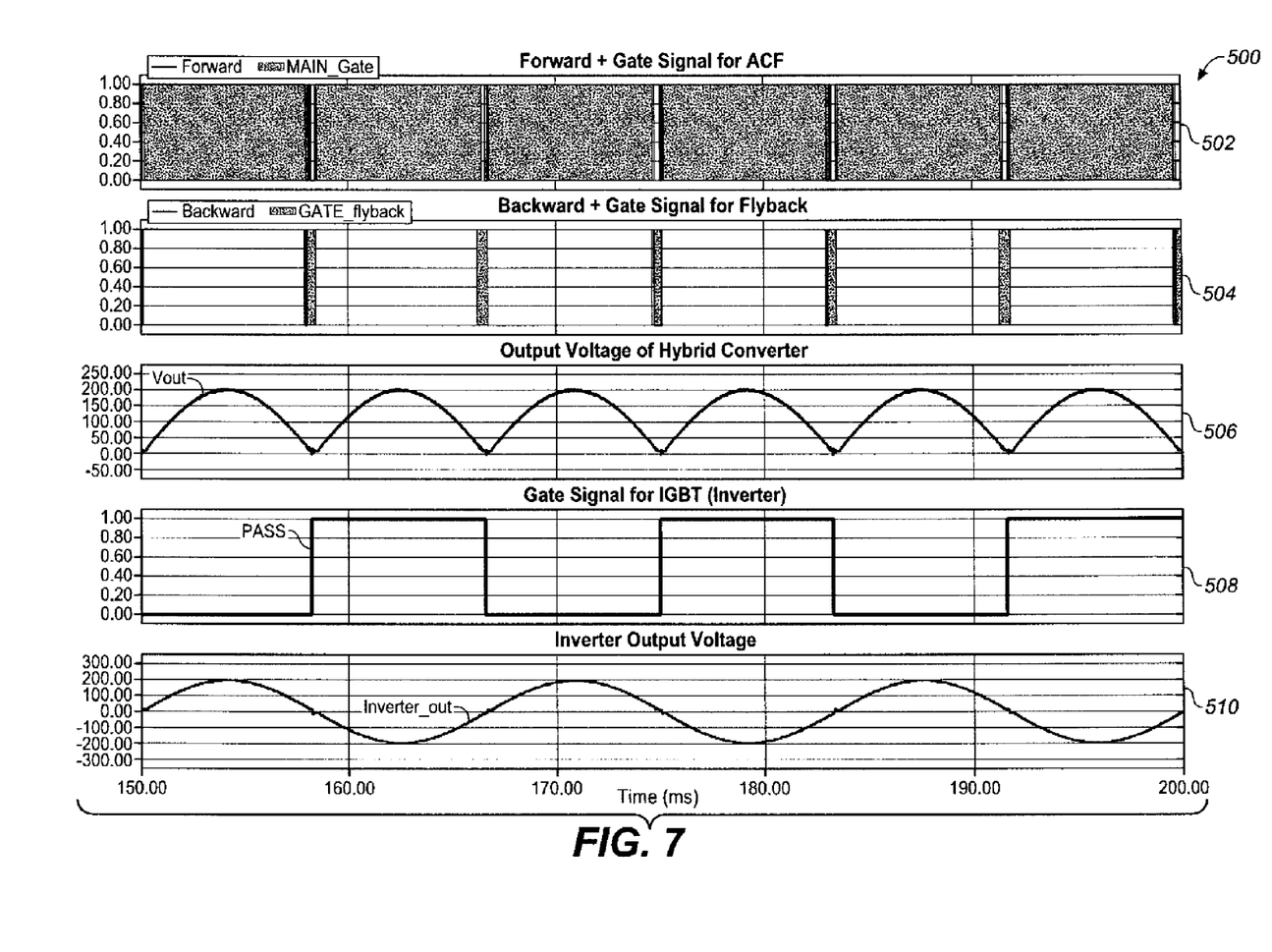
FIG. 7 is an exemplary waveform diagram for the power circuit under full load condition, according to an embodiment of the invention.

FIG. 7 is an exemplary waveform diagram 500 for the power converter system under high load condition (e.g., 1 KW), according to an embodiment of the invention. FIG. 7 includes waveform 502 representing control signals (e.g., MAIN and AUX) applied to the control terminals of main and active clamp switch in ACF converter 12 (or 112) to transfer the power in forward direction, waveform 504 representing the control signal (e.g., GATE_flyback) applied to the switch in flyback converter 14 or (114) to transfer the power in backward direction, waveform 506 representing the rectified sinusoidal output (e.g., Vo) from the power converter system, waveform 508 representing the gate control signal for the inverter circuit 450 to invert the rectified sinusoidal output, and waveform 510 representing the sinusoidal output from the inverter circuit 450 of power converter system.

Figure 8A:
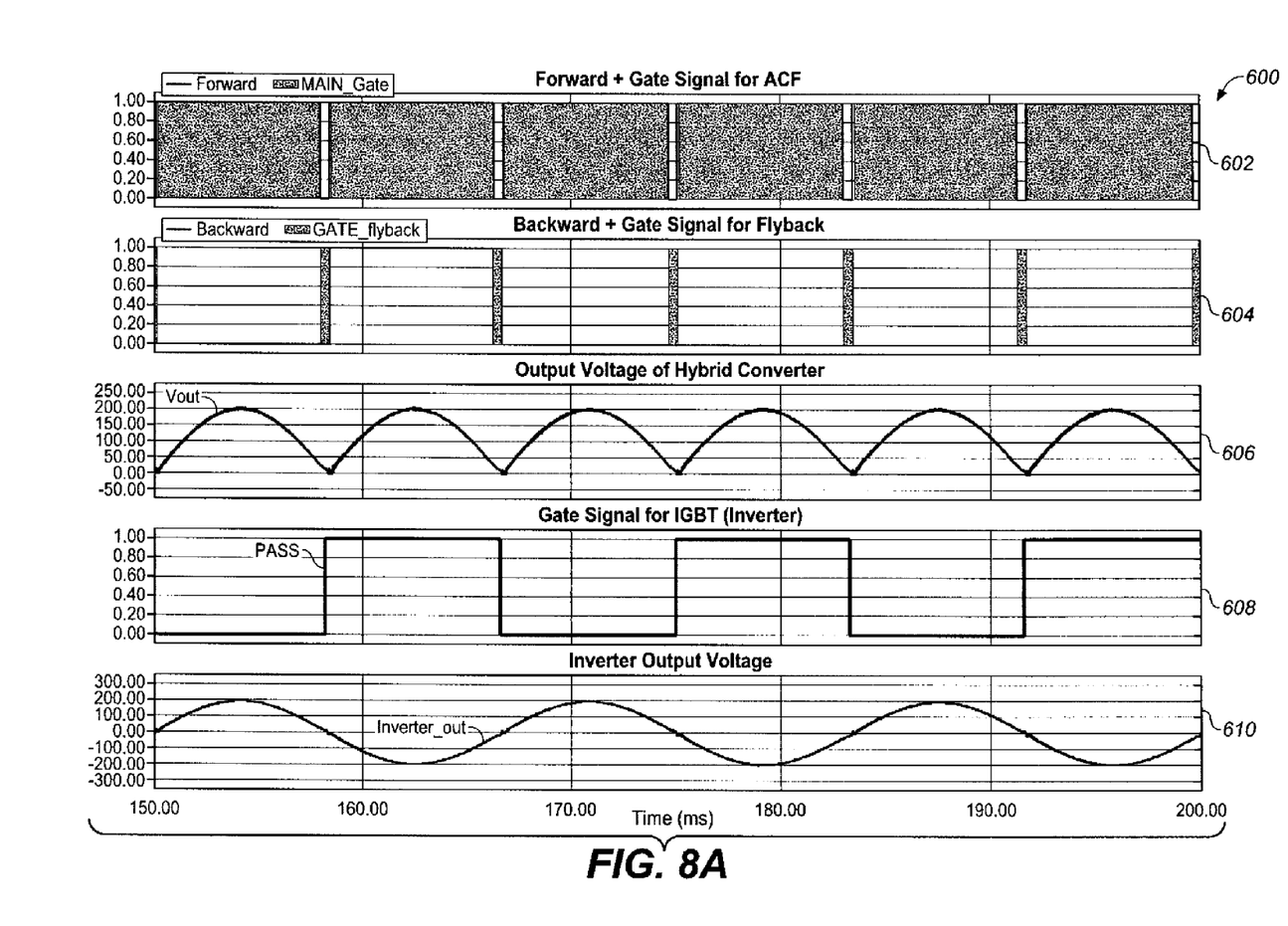
FIGS. 8A-8C are an exemplary waveform diagrams for the power circuit under progressively lighter load conditions, according to an embodiment of the invention.
Figure 8B:
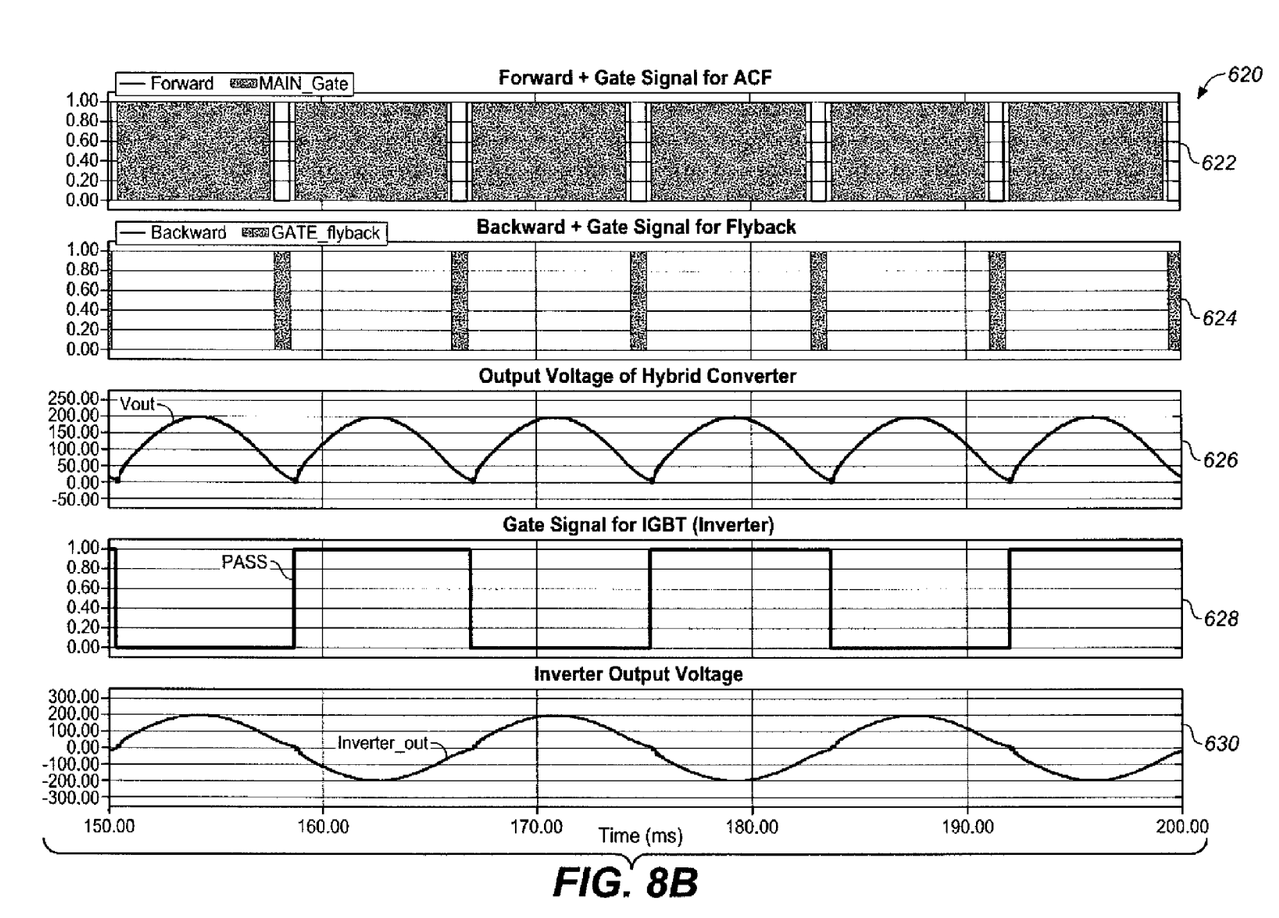
Figure 8C:
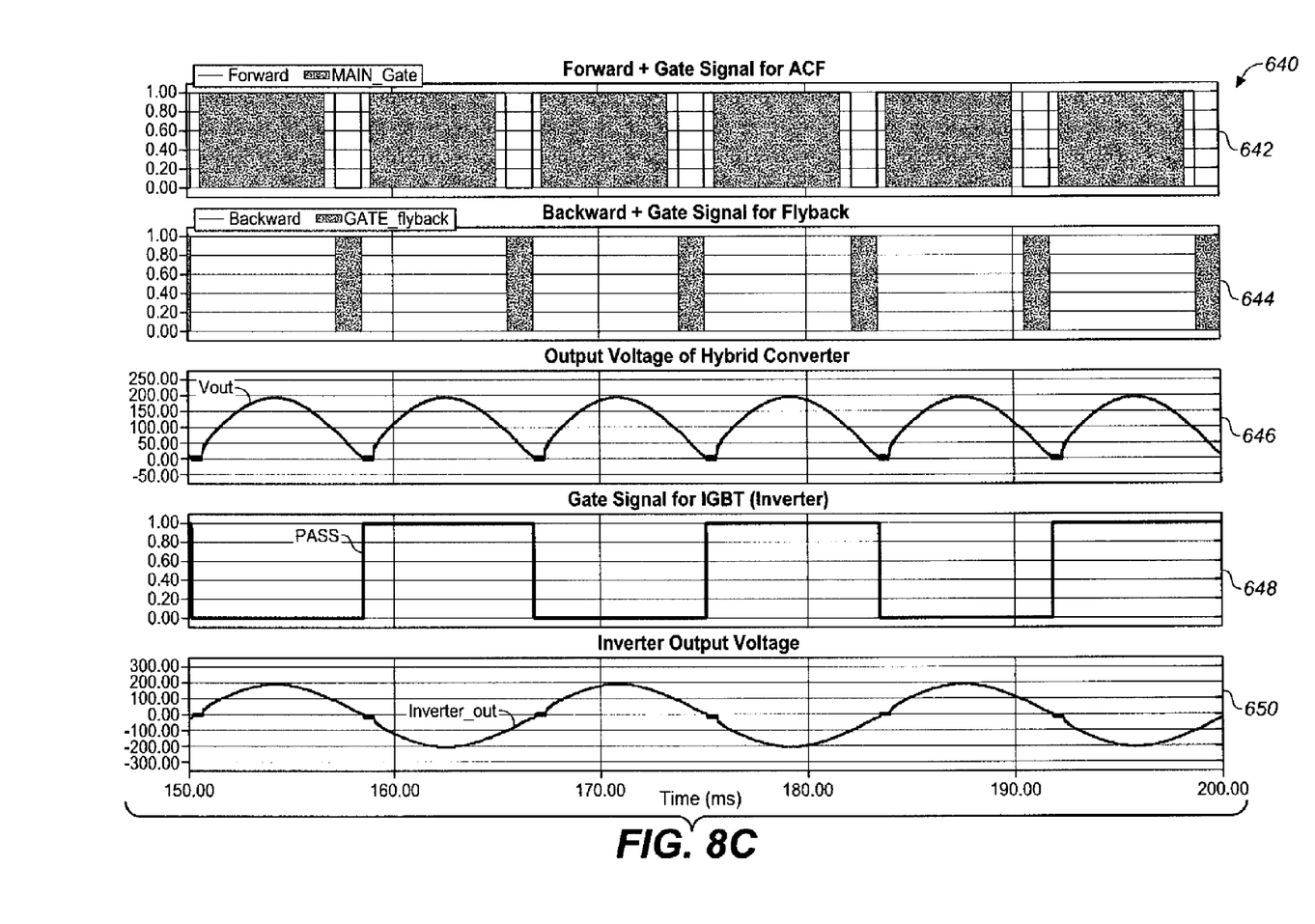

FIGS. 8A-8C are an exemplary waveform diagrams 600, 620, and 640 for the power converter system under progressively lighter load conditions (e.g., 100 W, 50 W, and 20 W, respectively), according to an embodiment of the invention.

Referring to FIG. 8A, waveform diagram 600 (corresponding to a load condition of, for example, 100 W) includes waveform 602 representing control signals (e.g., MAIN and AUX) applied to the control terminals of main and active clamp switch in ACF converter 12 (or 112) to transfer the power in forward direction, waveform 604 representing the control signal (e.g., GATE_flyback) applied to the switch in flyback converter 14 or (114) to transfer the power in backward direction, waveform 606 representing the rectified sinusoidal output (e.g., Vo) from the power converter system, waveform 608 representing the gate control signal for the inverter circuit 450 to invert the rectified sinusoidal output, and waveform 610 representing the sinusoidal output from the inverter circuit 450 of power converter system.

Referring to FIG. 8B, waveform diagram 620 (corresponding to a load condition of, for example, 50 W) includes waveform 622 representing control signals (e.g., MAIN and AUX) applied to the control terminals of main and active clamp switch in ACF converter 12 (or 112) to transfer the power in forward direction, waveform 624 representing the control signal (e.g., GATE_flyback) applied to the switch in flyback converter 14 or (114) to transfer the power in backward direction, waveform 626 representing the rectified sinusoidal output (e.g., Vo) from the power converter system, waveform 628 representing the gate control signal for the inverter circuit 450 to invert the rectified sinusoidal output, and waveform 630 representing the sinusoidal output from the inverter circuit 450 of power converter system.

Referring to FIG. 8C, waveform diagram 640 (corresponding to a load condition of, for example, 20 W) includes waveform 642 representing control signals (e.g., MAIN and AUX) applied to the control terminals of main and active clamp switch in ACF converter 12 (or 112) to transfer the power in forward direction, waveform 644 representing the control signal (e.g., GATE_flyback) applied to the switch in flyback converter 14 or (114) to transfer the power in backward direction, waveform 646 representing the rectified sinusoidal output (e.g., Vo) from the power converter system, waveform 648 representing the gate control signal for the inverter circuit 450 to invert the rectified sinusoidal output, and waveform 650 representing the sinusoidal output from the inverter circuit 450 of power converter system.

Compared to the exemplary waveforms for full load condition shown in FIG. 7, more gate signal is generated for the switch in the flyback converter under various light load conditions shown in FIGS. 8A-8C. This is seen by comparing waveforms 604, 624, and 644 (representing the control signal (e.g., GATE_flyback) applied to the switch in flyback converter 14 or (114) in progressively lighter load conditions) to the waveform 504 (representing the control signal (e.g., GATE_flyback) applied to the switch in flyback converter 14 or (114) in full load condition). In other words, the switch in flyback converter is turned on more under light load condition as compared to high load condition, thus providing more backward power flow in light load conditions. With more backward power flow in the power converter system, the output voltage Vo can follow the sinusoidal waveforms even in light load conditions as shown in waveform 610, 630, and 650.

Figure 9:
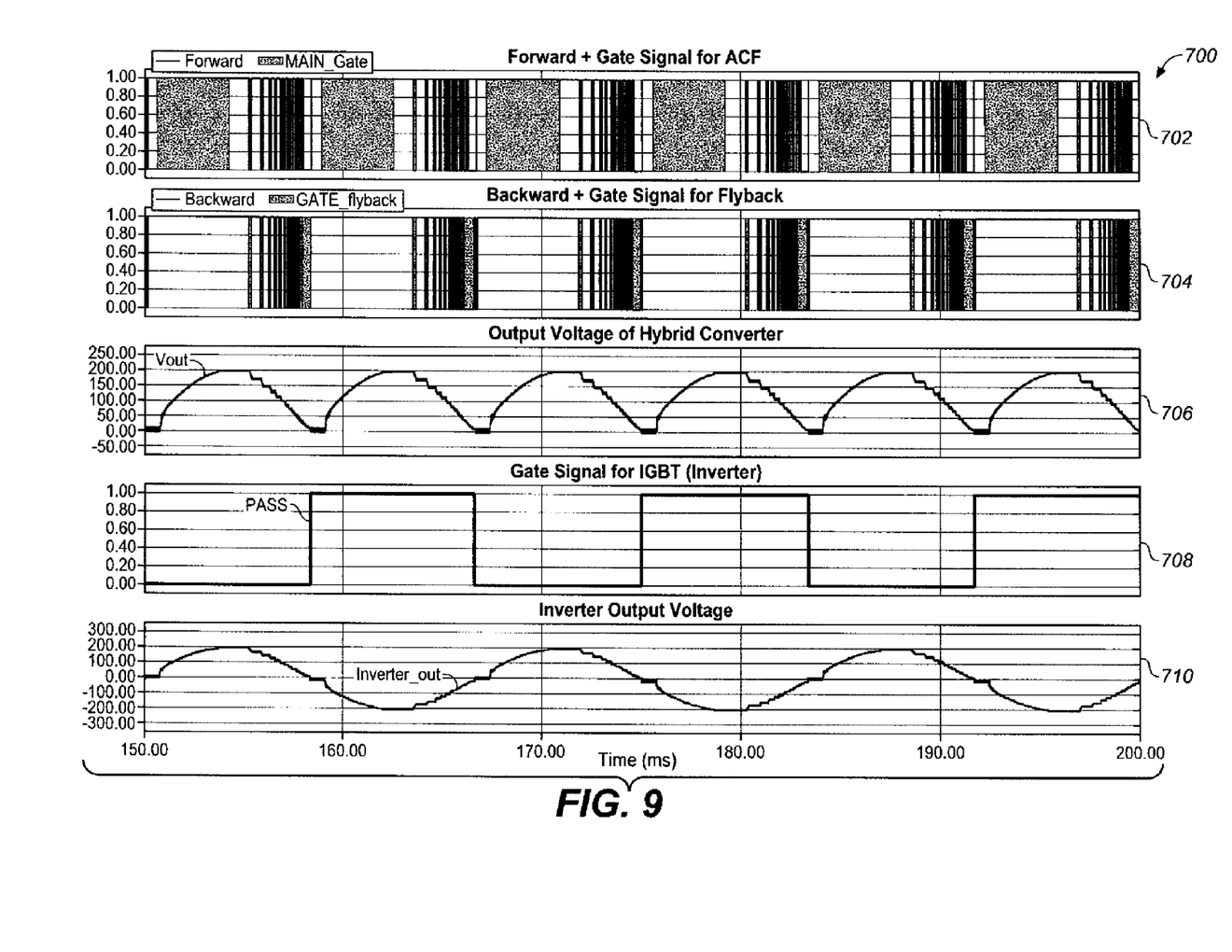
FIG. 9 is an exemplary waveform diagram for the power circuit under no load condition, according to an embodiment of the invention.

FIG. 9 is an exemplary waveform diagram 700 for the power converter system under no load condition, according to an embodiment of the invention. FIG. 9 includes waveform 702 representing control signals (e.g., MAIN and AUX) applied to the control terminals of main and active clamp switch in ACF converter 12 (or 112) to transfer the power in forward direction, waveform 704 representing the control signal (e.g., GATE_flyback) applied to the switch in flyback converter 14 or (114) to transfer the power in backward direction, waveform 706 representing the rectified sinusoidal output (e.g., Vo) from the power converter system, waveform 708 representing the gate control signal for the inverter circuit 450 to invert the rectified sinusoidal output, and waveform 710 representing the sinusoidal output from the inverter circuit 450 of power converter system.

Compared to the exemplary waveforms for full and light load conditions shown in FIGS. 7 and 8A-C, even more gate signal is generated for the switch in the flyback converter under no load condition shown in FIG. 9. In other words, switch in flyback converter is turned on even more under no load condition as compared to high load or light load condition, thus providing the most backward power flow in no load condition. With this backward power flow in the power converter system, the output voltage Vo can follow the sinusoidal waveforms even in no load condition as shown in waveform 710.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
   an input terminal operable to connect to a DC power source;
   an output terminal at which an output voltage can be provided;
   an active clamped forward converter operable to provide forward power flow from the DC power source to the output terminal, wherein the active clamped forward converter comprises:
      a transformer having a primary winding coupled to the input terminal and a secondary winding coupled to the output terminal;
      a main switch coupled to the primary winding of the transformer, the main switch operable to be turned on and off for charging and discharging a capacitor at the output terminal; and
      an active clamp switch operable to be turned on for clamping the primary winding of the transformer and to reduce magnetizing current of the transformer so as to reset a magnetic core of the transformer; and
   a flyback converter operable to provide backward power flow from the output terminal to the DC power source, wherein the flyback converter comprises a switch operable to be turned on for allowing energy stored in the capacitor at the output terminal to be fed back to the DC source;
   wherein the active clamped forward converter and the flyback converter cooperate to generate a rectified sinusoidal waveform at the output terminal.

2. The power converter system of claim 1 wherein the flyback converter is less active under high load conditions and is more active under light load conditions.

3. The power converter system of claim 1 wherein the flyback converter comprises a switch operable to be turned on for feeding energy back to the DC source.

4. The power converter system of claim 3 wherein the switch of the flyback converter is turned on less under high load conditions and is turned on more under light load conditions.

5. The power converter system of claim 1 wherein the DC power source comprises at least one solar module.

6. The power converter system of claim 1 comprising an inverter circuit operable to invert the rectified sinusoidal waveform to produce a full sinusoidal waveform.

7. A method for a power converter system having an input terminal operable to connect to a DC power source and an output terminal at which an output voltage can be provided, the method comprising:
   operating an active clamped forward converter to provide forward power flow from the DC power source to the output terminal, wherein the active clamped forward converter comprises:
      a transformer having a primary winding coupled to the input terminal and a secondary winding coupled to the output terminal;
      a main switch coupled to the primary winding of the transformer, the main switch operable to be turned on and off for charging and discharging a capacitor at the output terminal; and
      an active clamp switch operable to be turned on for clamping the primary winding of the transformer and to reduce magnetizing current of the transformer so as to reset a magnetic core of the transformer; and
   operating a flyback converter to provide backward power flow from the output terminal to the DC power source;
   wherein the active clamped forward converter and the flyback converter cooperate to generate a rectified sinusoidal waveform at the output terminal;
   wherein operating the flyback converter comprises turning on a switch of the flyback converter for allowing energy stored in the capacitor at the output terminal to be fed back to the DC source.

8. The method of claim 7 wherein the flyback converter is less active under high load conditions and is more active under light load conditions.

9. The method of claim 7 comprising inverting the rectified sinusoidal waveform to produce a full sinusoidal waveform.

10. A method for a power converter system having an input terminal operable to connect to a DC power source and an output terminal at which an output voltage can be provided, the method comprising:
    operating an active clamped forward converter to provide forward power flow from the DC power source to the output terminal, wherein the active clamped forward converter comprises:
       a transformer having a primary winding coupled to the input terminal and a secondary winding coupled to the output terminal;
       a main switch coupled to the primary winding of the transformer, the main switch operable to be turned on and off for charging and discharging a capacitor at the output terminal; and
       an active clamp switch operable to be turned on for clamping the primary winding of the transformer and to reduce magnetizing current of the transformer so as to reset a magnetic core of the transformer; and
    operating a flyback converter to provide backward power flow from the output terminal to the DC power source;
    wherein the active clamped forward converter and the flyback converter cooperate to generate a rectified sinusoidal waveform at the output terminal;
    wherein operating the flyback converter comprises turning on a switch of the flyback converter for feeding energy back to the DC source.

11. The method of claim 10 wherein the switch of the flyback converter is turned on less under high load conditions and is turned on more under light load conditions.

12. A power converter system comprising:
    an input terminal operable to connect to a DC power source;

an output terminal at which an output voltage can be provided;

an active clamped forward converter operable to provide forward power flow from the DC power source to the output terminal, the active clamped forward converter comprising:

a transformer having a primary winding coupled to the input terminal and a secondary winding coupled to the output terminal;

a main switch coupled to the primary winding of the transformer, the main switch operable to be turned on and off for charging and discharging a capacitor at the output terminal; and an active clamp switch operable to be turned on for clamping the primary winding of the transformer and to reduce magnetizing current of the transformer so as to reset a magnetic core of the transformer; and a flyback converter operable to provide backward power flow from the output terminal to the DC power source, the flyback converter comprising a switch operable to be turned on for allowing energy stored in the capacitor at the output terminal to be fed back to the DC source;

wherein the active clamped forward converter and the flyback converter cooperate to generate a rectified sinusoidal waveform at the output terminal.

13. The power converter system of claim 12 wherein the switch of the flyback converter is turned on less under high load conditions and is turned on more under light load conditions.

14. The power converter system of claim 13 wherein the flyback converter comprises a switch operable to be turned on for allowing energy stored in the capacitor at the output terminal to be fed back to the DC source.

15. The power converter system of claim 12 wherein the flyback converter comprises a switch operable to be turned on for feeding energy back to the DC source.

16. The power converter system of claim 15 wherein the switch of the flyback converter is turned on less under high load conditions and is turned on more under light load conditions.

17. The power converter system of claim 12 wherein the DC power source comprises at least one solar module.

18. The power converter system of claim 12 comprising an inverter circuit operable to invert the rectified sinusoidal waveform to produce a full sinusoidal waveform.

* * * * *